United States Patent
Sakano et al.

(10) Patent No.: US 7,400,968 B2
(45) Date of Patent: Jul. 15, 2008

(54) NAVIGATION APPARATUS AND PROGRAM

(75) Inventors: Hirokazu Sakano, Tokai (JP); Yuri Takeichi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 530 days.

(21) Appl. No.: 11/185,842

(22) Filed: Jul. 21, 2005

(65) Prior Publication Data

US 2006/0031005 A1 Feb. 9, 2006

(30) Foreign Application Priority Data

Aug. 3, 2004 (JP) .............................. 2004-226904
Jan. 31, 2005 (JP) .............................. 2005-023419

(51) Int. Cl.
*G01C 21/26* (2006.01)

(52) U.S. Cl. .................... 701/200; 701/211; 340/995.1; 340/995.14

(58) Field of Classification Search .................. 701/200, 701/211–212; 340/995.1, 995.14, 995.15, 340/995.17
See application file for complete search history.

(56) References Cited

U.S. PATENT DOCUMENTS 6,650,253 B2* 11/2003 Mochizuki et al. ........ 340/995.1
7,292,936 B2* 11/2007 Furukawa ................... 701/209
2003/0191580 A1* 10/2003 Endo et al. .................. 701/202

FOREIGN PATENT DOCUMENTS

| JP | A-2000-193473 | 7/2000 |
|---|---|---|
| JP | A-2001-194161 | 7/2001 |
| JP | A-2002-236028 | 8/2002 |
| JP | A-2003-57054 | 2/2003 |
| JP | A-2003-57059 | 2/2003 |
| JP | A-2004-69653 | 3/2004 |
| JP | A-2004-301525 | 10/2004 |
| JP | A-2004-333467 | 11/2004 |

* cited by examiner

*Primary Examiner*—Yonel Beaulieu
(74) *Attorney, Agent, or Firm*—Posz Law Group, PLC (57) ABSTRACT

In a vehicle navigation apparatus, displaying an enlarged view of an intersection within a guide route is suppressed when a value N associated with a corresponding passing direction of the intersection exceeds a learning reference value. When the value N is not more than the learning reference value, the enlarged view of the intersection is displayed on a display unit. When a deletion operation is received while the enlarged view is displayed, the value N is incremented by "1." In contrast, when an enlarged view display operation is received while the enlarged view is not displayed, the value N is decremented by "1."

13 Claims, 8 Drawing Sheets

NAVIGATION APPARATUS AND PROGRAM

CROSS REFERENCE TO RELATED APPLICATIONS

This application is based on and incorporates herein by reference Japanese Patent Applications No. 2004-226904 filed on Aug. 3, 2004 and No. 2005-23419 filed on Jan. 31, 2005.

FIELD OF THE INVENTION

The present invention relates to a navigation apparatus which displays an enlarged view of an intersection on a display unit.

BACKGROUND OF THE INVENTION

Conventionally, there is known a navigation apparatus which displays an enlarged view of an intersection on a display unit. That is, when the vehicle comes to a position before the intersection in a navigation route, the navigation apparatus displays an enlarged view of the intersection by enlarging the intersection from a map that has been displayed on the display unit.

However, regarding an intersection through which the vehicle has frequently passed, it is unnecessary for a user to display an enlarged view of the intersection. Further, upon displaying of the enlarged view of the intersection, some portions (e.g., a map around the intersection, traffic congestion information, and construction information) are covered with the enlarged view. Occasionally such information may be more important for the user.

To handle such cases, for example, regarding an intersection, through which the vehicle has passed many times, displaying the enlarged view of the intersection may be suppressed. However, even regarding an intersection through which the vehicle has passed many times, the user may sometimes need the display of the enlarged view of the intersection. Otherwise, the user does not need an enlarged view any more regarding an intersection through which the vehicle has passed several times. Furthermore, whether a user requests such frequent guidance is depending on user's preference, age, and the like.

SUMMARY OF THE INVENTION

In view of the above problems, it is an object of the present an invention to provide a navigation apparatus to display an enlarged view of an intersection to better meet respective users' needs in comparison with the conventional techniques.

To achieve the above object, a navigation apparatus is provided with the following: A display control unit is included for displaying an enlarged view of an intersection on a display unit in a section before the intersection. A suppression instruction detection unit is included for detecting a suppression instruction of displaying the enlarged view of the intersection. A storage unit is included for storing display suppression history data by associating a detection of the suppression instruction with a position of the intersection. A suppression history determination unit is included for determining whether the display suppression history data satisfies a predetermined display suppression criterion. And a suppression unit is included for suppressing displaying the enlarged view of the intersection when the display suppression history data is determined to satisfy the predetermined display suppression criterion.

Under this structure, display suppression history data can store a suppression instruction for suppressing displaying an enlarged view with respect to each of intersections. Furthermore, suppressing displaying the enlarged view of the intersection is practically conducted based on a determination that the display suppression history data satisfies a criterion, so displaying the enlarged view with respect to each of the intersections can be properly conducted or suppressed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
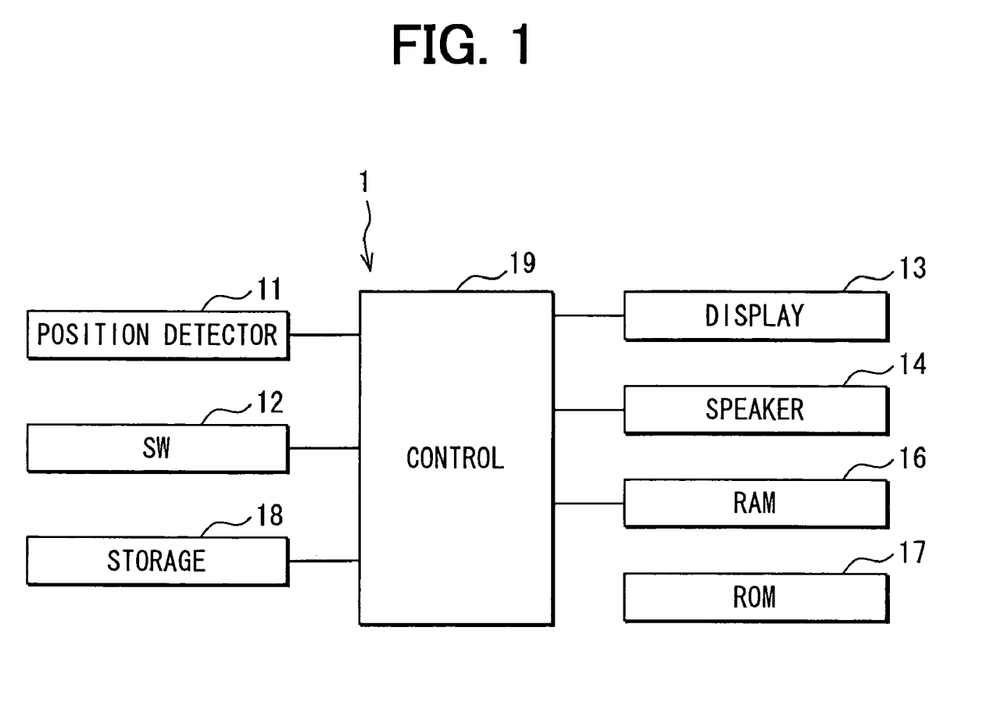
FIG. 1 is a block diagram showing a hardware construction of a vehicle navigation apparatus according to a first embodiment of the present invention.

Hereinbelow, a first embodiment of the present invention will be described. FIG. 1 shows a hardware construction of a vehicle navigation apparatus 1 mounted in a subject vehicle according to the present embodiment.

The vehicle navigation apparatus 1 has a position detector 11, an operation switch group 12, an image display unit 13, a speaker 14, a RAM 16, a ROM 17, an external storage medium 18, and a control circuit 19.

The position detector 11 has sensors such as a terrestrial magnetism sensor, a gyroscope, a vehicle speed sensor to detect vehicle speed, and a GPS receiver (all not shown). The position detector 11 outputs, to the control circuit 19, information to specify current position and/or direction of the vehicle based on the respective characteristics of these sensors.

The operation switch group 12 includes input devices such as multiple mechanical switches provided on the vehicle navigation apparatus 1, and a touch panel provided over a display screen of the image display unit 13 and the like. The operation switch group 12 outputs signals based on depression of the mechanical switch and/or the touch panel to the control circuit 19.

The image display unit 13 displays a video image based on a video signal outputted from the control circuit 19 for the user. This video image includes a map around a current position or the like.

The external storage medium 18 is a nonvolatile storage medium such as an HDD. The external storage medium 18 holds programs read and executed by the control circuit 19, map data for route guidance, display suppression history data, screen change operation history data and the like. Note that it may be arranged such that the vehicle navigation apparatus 1 has a unit to read data from a portable storage medium such as a CD-ROM or a DVD-ROM, and the above programs and map data are read from the CD-ROM or the DVD-ROM.

The map data includes position information of road parts (links) and intersections (nodes), road data showing connection relation between intersections and road parts, facility data such as position or name of facility, and the like.

The display suppression history data is associated with a pair of an intersection in map data and an approach/exit direction (i.e., a passing direction) regarding the intersection, and stored in a storage medium. More particularly, the display suppression history data has multiple intersection-based entries, and each entry has multiple approach/exit direction-based sub entries. The approach/exit direction (or the passing direction) indicates a direction from which the vehicle enters the intersection and a direction to which the vehicle moves out the intersection.

For example, in the case of four-forked road where an east-to-west road intersects a south-to-north road, there are 12 types of approach/exit directions or passing directions: a left turning i.e. to approach from north and exit to east; straight traveling i.e. to approach from north and exit to south; right turning i.e. to approach from north and exit to west; left turning i.e. to approach from east and exit to south; straight traveling i.e. to approach from east and exit to west; right turning i.e. to approach from east and exit to north; left turning i.e. to approach from south and exit to west; straight traveling i.e. to approach from south and exit to north; right turning i.e. to approach from south and exit to east; left turning i.e. to approach from west to exit to north; straight traveling i.e. to approach from west and exit to east; and right turning i.e. to approach from west and exit to south.

Note that in the present embodiment, each intersection entry does not always include sub entries on all the approach/exit directions of the intersection. That is, a sub entry about an approach/exit direction to pass the intersection along the road is not included. For example, in a case where the above-described four-forked road is an ordinary four-forked road, the entry has total 8 sub entries of right turning and left turning without sub entries of 4 straight traveling.

Further, each entry has count data. Upon shipment of the vehicle navigation apparatus 1, the count data has the same value as a learning reference value to be described later. Further, as described later, the count data value is incremented/decremented. Note that in the following description, the count data value will be denoted as a value N.

The screen change operation history data is history data which is associated with types of user's screen display change operation to change items of screen display on the image display unit 13 and is stored in the storage medium. More particularly, the screen change operation history data has multiple entries based on the screen display change operation type, and each entry has count data. Upon shipment of the vehicle navigation apparatus 1, the count data value is zero.

Further, the count data value is incremented/decremented as in the case of the value N. In the following description, the count data value of the screen change operation history data will be denoted as a value A.

Note that types of the screen display change operations include a predetermined operation to scroll a map by a predetermined distance in a traveling direction, a predetermined operation to enlarge or reduce a map display scale, a predetermined operation to change a map display from a 2-split screen display to a whole-screen display, a predetermined operation for transit to a VICS (Vehicle Information and Communication System) information display screen, and the like.

The control circuit (corresponding to a computer) 19 executes the programs for the operations of the vehicle navigation apparatus 1 read from the ROM 17 and the external storage medium 18. Upon execution of program, the control circuit 19 reads information from the RAM 16, the ROM 17, and the external storage medium 18, writes information into the RAM 16 and the external storage medium 18, and performs signal transmission/reception with the position detector 11, the operation switch group 12, the image display unit 13, and the speaker 14.

Particular processing performed by execution of program by the control circuit 19 includes current position specifying processing, guide route search processing, route guide processing and the like.

The current position specifying processing specifies the current position and direction of the vehicle based on a signal from the position detector 11, using the technology of well-known map matching or the like.

The guide route search processing receives the input of destination by the user from the input device, and calculates an optimum guide route from a current position to the destination.

The route guide processing is for performing an emphasized display of a guide intersection by reading map data from the external storage medium 18 and then outputting an image where a calculated guide route, a target facility, a transit facility, a current position and the like are superposed on a map based on the read map data, to the image display unit 13. Furthermore, when the vehicle has arrived at a position before a guide intersection, for example, a guide voice signal is outputted to the speaker 14 so as to indicate right turning, left turning, or the like. Note that the guide intersection means an intersection where the subject vehicle turns left/right or the like instead of continuing traveling a road the vehicle has been traveling before entering the intersection in accordance with the guide route.

Figure 2:
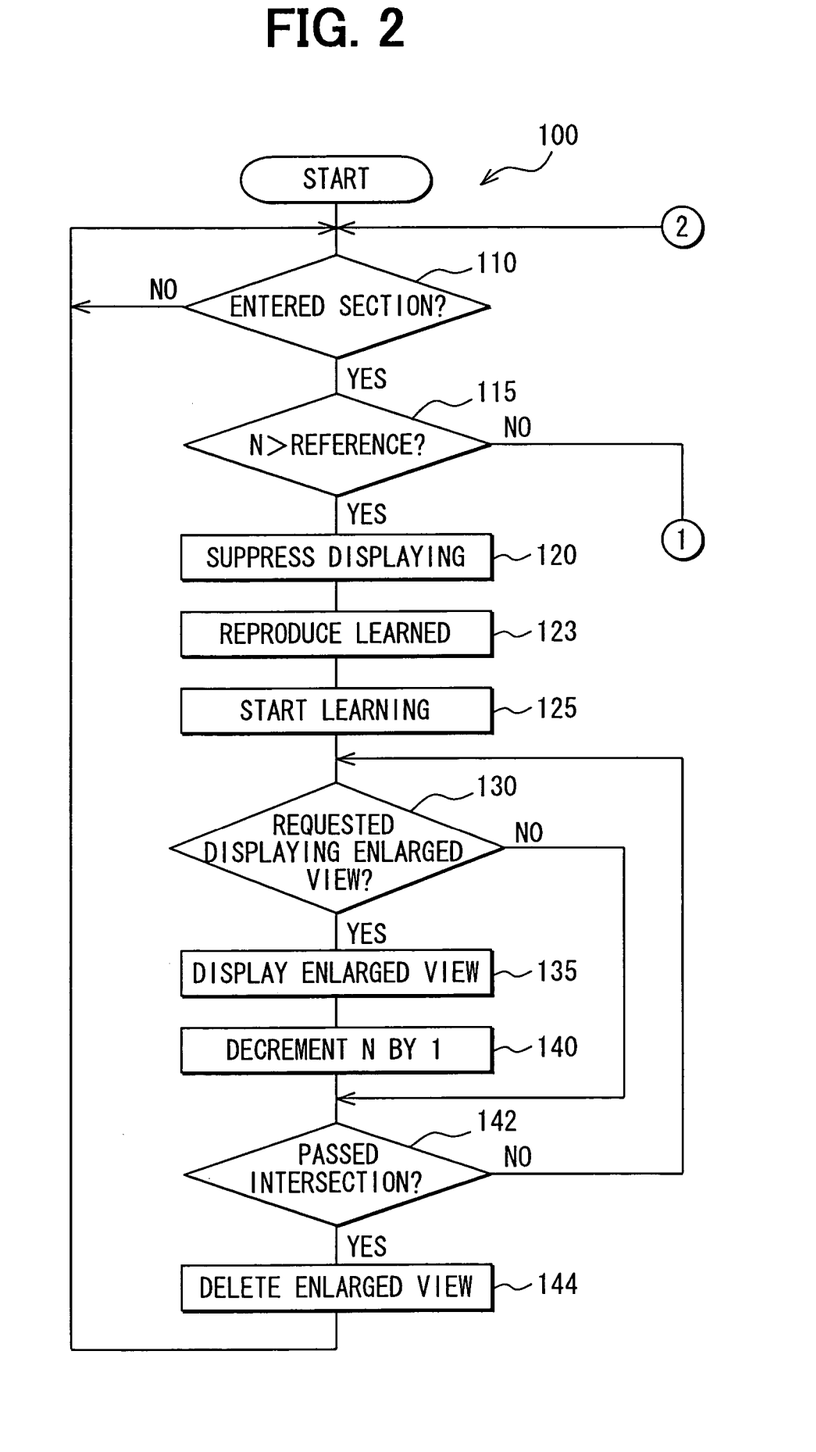
FIGS. 2, 3 are flowcharts of an intersection enlarged view display control program.
Figure 3:
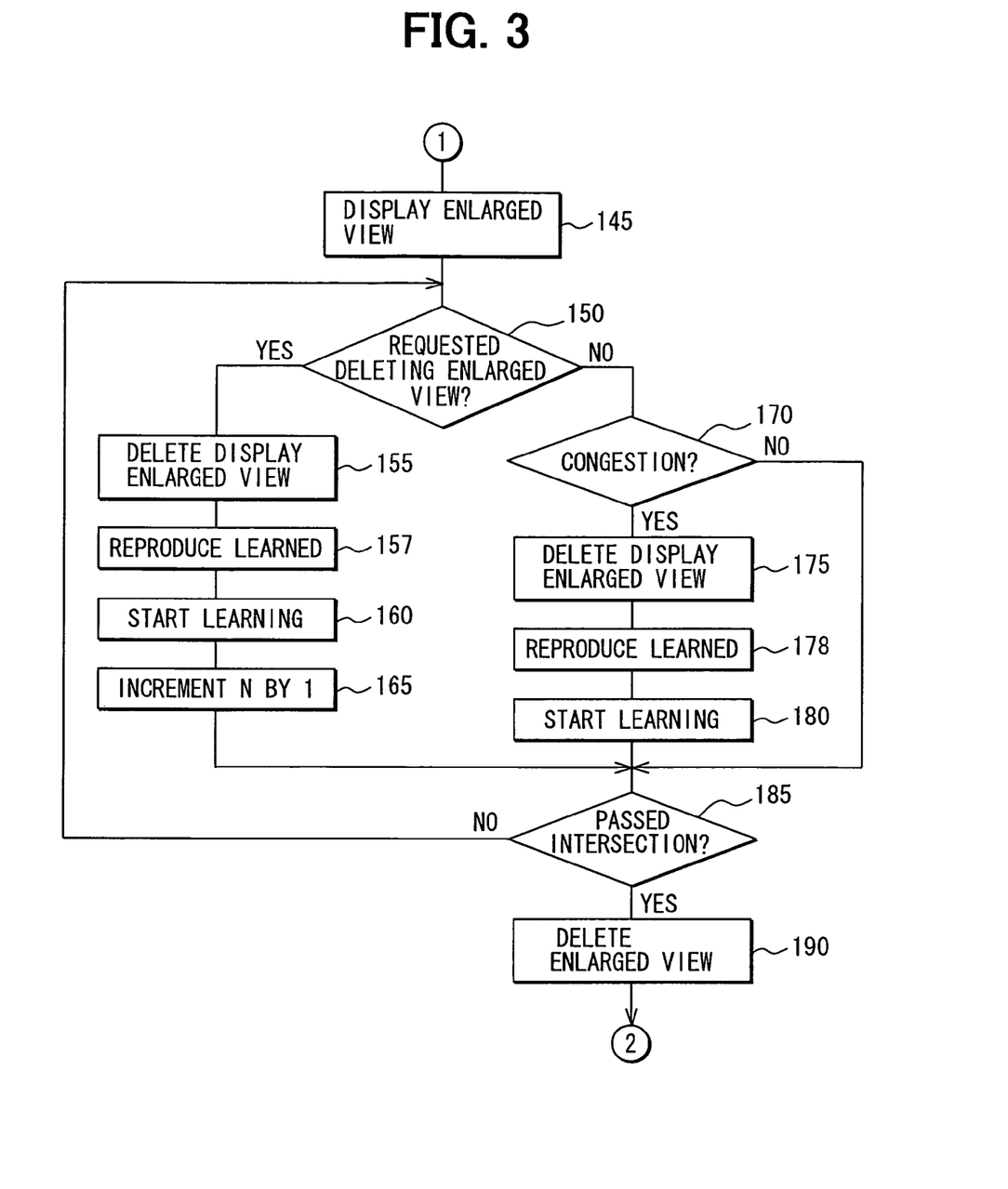

Next, an intersection enlarged view display control program 100 for the vehicle when it approaches the guide intersection as a part of program for the route guide processing will be described in the flowcharts of FIGS. 2 and 3.

Figure 4:
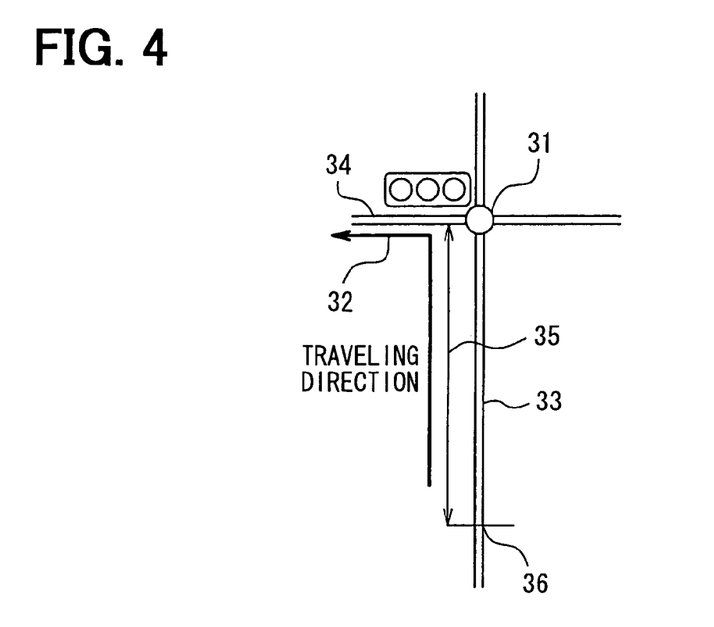
FIG. 4 is a schematic diagram of an intersection showing a decision section.

The control circuit 19 continuously performs the intersection enlarged view display control program 100 during the route guide processing. At Step 110, it is determined whether or not the vehicle has entered a decision section, and this step is repeated until it is determined that the vehicle has entered a decision section. More particularly, it is determined whether or not the vehicle current position is within a predetermined distance (e.g., 300 meters) before the guide intersection along the guide route. FIG. 4 shows a schematic bird's-eye view of an intersection 31 showing the relation between the decision section and the intersection. In this figure, the traveling direction along the guide route is along a route of approach from a road 33 to the guide intersection 31 and exit to a road 34 as indicated with an arrow 32. In this case, the decision section corresponds to a section indicated with an arrow 35 between the guide intersection 31 and a point 36 before the guide intersection 31 by a predetermined distance.

When it is determined that the vehicle has entered the decision section, then at Step 115, the count data of the display suppression history data is read. This count data of the display suppression history data is associated with the prearranged approach/exit direction along the guide route about the guide intersection, through which the vehicle is to pass along the guide route. More particularly, the count data in the sub entry, corresponding to the prearranged approach/exit direction in the entry of the guide intersection in the display suppression history data, is read. Then it is determined whether or not the value N of the read count data is greater than a predetermined learning reference value stored in the external storage medium 18. The learning reference value is, e.g., "3."

Note that when the value N exceeds the learning reference value, the value N corresponds to a suppression criterion. In this case, Step 120 is performed. When the value N is less than the learning reference value, Step 145 in FIG. 3 is performed.

At Step 120, displaying (a display) of an intersection enlarged view is suppressed. The intersection enlarged view is an enlarged view of a portion corresponding to an intersection or a guide intersection in an already-displayed map in the route guide processing. For example, the view of the guide intersection in an area 1/20 of the display screen of the image display unit 13 is expanded to a view occupying a right or left half area of the display screen. At Step 120, displaying the intersection enlarged view is not performed, but an icon in a size of about 1/10 of the entire screen, indicating that displaying the guide intersection is currently suppressed, is displayed at a corner of the display screen of the image display unit 13. The icon may be the map of the guide intersection as the subject of suppression of the enlarged view display.

Figure 5:
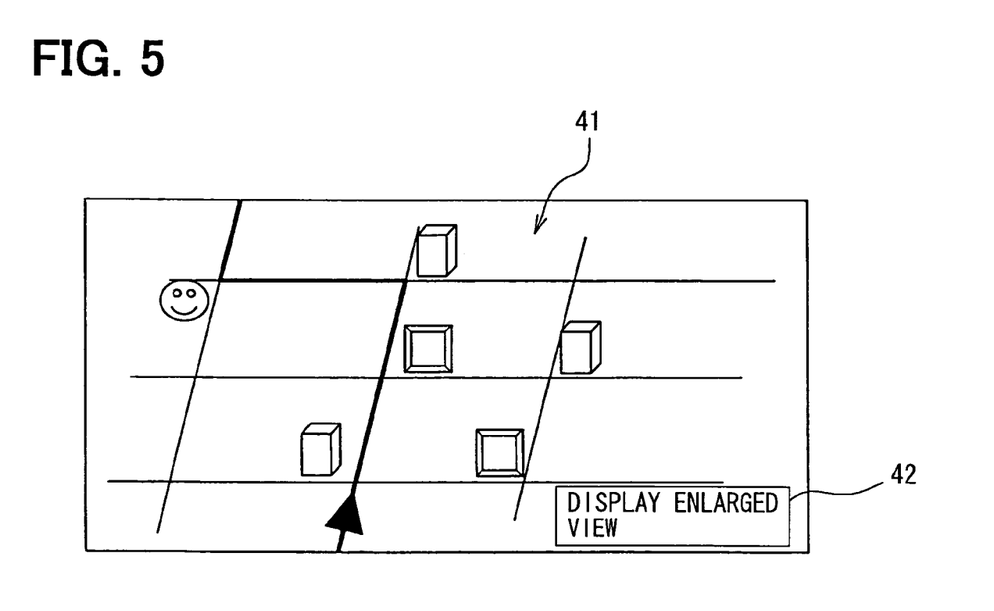
FIG. 5 is an example of a display screen image on an image display unit of the vehicle navigation apparatus.

FIG. 5 is an example of a display screen image displayed on the image display unit 13 at this time. An icon 42 as described above in the form of a button is displayed at a lower right corner of a normal map display 41.

Next, at Step 123 following Step 120, reproduction of learned operation is performed. This means processing for changing items of the display screen on the display unit based on the above-described screen change operation history data. More particularly, among the entries of screen change operation history data, an entry in which the value A is the maximum and greater than a predetermined threshold value (e.g., "3") is selected, and the display screen on the image display unit 13 is changed in correspondence with the case where the screen display change operation related to the entry is actually performed on the image display unit 13. Note that when there is no entry where the value A is greater than the threshold value "3," the change of the screen display based on the screen change operation history data is not performed.

Next, at Step 125, learning of screen display change operation in a predetermined period of, e.g., several seconds, is started. The learning of operation is performed in common also in the processing shown in FIG. 3, during which an item of the operation performed by the user using the operation switch group 12 is stored into the RAM 16. When the learning is completed at the end of the predetermined period, one or multiple entries of screen change operation history data corresponding to the item of operation stored in the RAM 16 are specified, and the value A of the specified one or multiple entries is incremented by "1."

At Step 130, it is determined whether or not the intersection enlarged view is not currently displayed and an enlarged view display operation by the user, indicating a request for displaying the intersection enlarged view, has been made from the operation switch group 12. An enlarged view display operation is, in FIG. 5, for example, depression of a portion corresponding to an icon 42 of the touch panel in the operation switch group 12. When it is determined that the intersection enlarged view is not currently displayed and the enlarged view display operation has been made, Step 135 is performed. Further, when it is determined that the intersection enlarged view is currently displayed or the enlarged view display operation has not been made, Step 142 is performed.

At Step 135, the above-described intersection enlarged view is displayed. As described above, the intersection enlarged view occupies a large part of the display screen on the image display unit 13.

At Step 140, the value N is decremented by "1." The value N is the same as that of the sub entry compared with the learning reference value at immediately previous Step 115. Decrementing the value N by "1" is processing to further recede from the value N when the current value N is equal to or lower than the learning reference value, or to approximate the value N to the learning reference value when the current value N is higher than the learning reference value. Accordingly, this processing makes the display suppression history data, associated with the prearranged approach/exit direction of the guide intersection as the subject of the enlarged view display operation, more disadvantageous so as to satisfy the above-described suppression criterion.

Next, at Step 142, it is determined whether or not the vehicle has passed the guide intersection. When it is determined that the vehicle has passed the guide intersection, Step 144 is performed, while when it is determined that the vehicle has not passed the guide intersection, Step 130 is performed.

At Step 144, when the intersection enlarged view is currently displayed, the display of the intersection enlarged view is deleted and normal map display for route guidance is then made. At Step 110 subsequent to Step 144, it is determined whether or not the vehicle has entered the next decision section.

At Step 145, the intersection enlarged view is displayed on the display unit 13 by similar processing to that at Step 135.

At Step 150, it is determined whether or not the intersection enlarged view is currently displayed and the user requests deletion of the intersection enlarged view. The user's request for deletion of the intersection enlarged view means detection of the user's deletion operation using the operation switch group 12 indicating deletion of the intersection enlarged view displayed on the image display unit 13 at Step 145. When it is determined that the intersection enlarged view is currently displayed and the user's deletion operation has been made, Step 155 is performed. Furthermore, when it is determined that the intersection enlarged view is not displayed or the user's deletion operation has not been made, Step 170 is performed.

At Step 155, the intersection enlarged view is deleted by similar processing to that at Step 144.

Next, at Step 157, the reproduction of learned operation is performed by similar processing to that at Step 123.

At Step 160, the learning of screen display change operation is started by similar processing to that at Step 125.

At Step 165, the value N is incremented by "1." The value N is the same as that of the sub entry compared with the learning reference value at immediately previous Step 115. Incrementing the value N by "1" is processing to approximate the value N to the learning reference value when the current value N is lower than the learning reference value, or to recede from the value N when the current value N is equal to or higher than the learning reference value. Accordingly, this processing makes the display suppression history data, associated with the prearranged approach/exit direction of the guide intersection as the subject of the enlarged view display operation, more advantageous so as to satisfy the above-described suppression criterion. Following Step 165, Step 185 is performed.

At Step 170, it is determined whether or not the intersection enlarged view is currently displayed and an approach road along the guide route to the guide intersection is congested by traffic. As the determination as to whether or not the approach road is congested, when a predetermined period (e.g., 2 minutes) has passed since the vehicle entered the decision section and mean vehicle speed from the entrance of the vehicle in the decision section to the current time point is equal to or lower than a predetermined speed (e.g., 1 km/h), it is determined that the approach road is congested, otherwise, it is determined that the approach road is not congested. Note that in a case where the vehicle navigation apparatus 1 has a traffic information receiving function such as VICS, the determination of traffic congestion at the guide intersection may be performed by using the function. When it is determined that the intersection enlarged view is currently displayed and the approach road is congested, Step 175 is performed. Further, when it is determined that the intersection enlarged view is not currently displayed or the approach road is not congested, Step 185 is performed.

At Step 175, the intersection enlarged view is deleted by similar processing to that at Step 155.

At Step 178, the reproduction of learned operation is performed by similar processing to that at Step 157.

At Step 180, the learning of screen display change operation is started by similar processing to that at Step 160. Following Step 180, Step 185 is performed.

At Step 185, it is determined by similar processing to that at Step 142 whether or not the vehicle has passed the guide intersection. When it is determined that the vehicle has passed the guide intersection, Step 190 is performed. When it is determined that the vehicle has not passed the guide intersection, Step 150 is performed.

At Step 190, when the intersection enlarged view is currently displayed as in the case of Step 144, the display of the intersection enlarged view is deleted, and then ordinary map display for route guidance is restored. Following Step 190, then at Step 110, it is determined whether or not the vehicle has entered the next decision section.

As the control circuit 19 performs the above-described intersection enlarged view display control program 100, the vehicle navigation apparatus 1: (A) determines whether or not the value N associated with the prearranged approach/exit direction of a guide intersection in a guide route is higher than the learning reference value (see Step 115); (B) based on the determination that the value N is higher than the learning reference value, suppresses displaying of the intersection enlarged view on the image display unit 13 in a section before the guide intersection along the guide route (see Step 120). Further, (C) based on the determination that the value N is equal to or lower than the learning reference value, the apparatus 1 displays the intersection enlarged view in the section before the guide intersection along the guide route (see Step 145) on the image display unit 13.

Further, in the decision section for the guide intersection, (D) based on the reception of deletion operation while the image display unit 13 displays the intersection enlarged view, the vehicle navigation apparatus 1 deletes the display of the intersection enlarged view (see Steps 150 and 155), on the image display unit 13. Further, the apparatus 1 increments the value N, associated with the prearranged approach/exit direction along the guide route for the guide intersection related to the enlarged view as the subject of deletion, by "1" (see Step 165).

In this arrangement, while the vehicle repeats traveling along a guide route, when the deletion operation to delete an intersection enlarged view is frequently performed regarding an approach/exit direction of a guide intersection and the value N regarding the approach/exit direction of the guide intersection has exceeded the learning reference value, the vehicle navigation apparatus 1 suppresses displaying of the intersection enlarged view.

Accordingly, the vehicle navigation apparatus 1 displays the intersection enlarged view in correspondence with the user's requirements based on the history of deletion operation by the user to delete the display of the intersection enlarged view.

Further, in the decision section for the guide intersection, (E) based on the reception of enlarged view display operation when the image display unit 13 does not display the intersection enlarged view, the vehicle navigation apparatus 1 causes the image display unit 13 to display the intersection enlarged view where the vehicle is to enter next in the guide route (see Steps 130 and 135). Further, the value N associated with the prearranged approach/exit direction along the guide route is decremented by "1" (see Step 140).

In this arrangement, while the vehicle repeats traveling along a guide route, when the value N based on the difference between the number of the deletion operations and the number of enlarged view display operations regarding the approach/exit direction of a guide intersection has exceeded the learning reference value, the vehicle navigation apparatus 1 suppresses displaying the intersection enlarged view. In this arrangement, the user's enlarged view display operation is reflected in the display of the intersection enlarged view and determination of suppression of displaying the intersection enlarged view.

Further, the vehicle navigation apparatus 1 (F) determines whether or not the guide intersection is congested by traffic (see Step 170), and based on the determination of traffic congestion, suppresses displaying the intersection enlarged view on the image display unit 13 in a decision section before the guide intersection along the guide route (Step 175). This arrangement meets the user's need to obtain various information other than the intersection enlarged view when the vehicle is in heavy traffic.

Further, the vehicle navigation apparatus 1: (G) receives the user's screen display change operation to change the items of screen display on the image display unit. The vehicle navigation apparatus stores history data of screen display change operation, received in a predetermined period after the suppression of displaying the intersection enlarged view, into the storage medium (see Steps 125, 160, and 180); and (H) when displaying the intersection enlarged view has been suppressed, changes the items of screen display on the display unit based on the history data of the operation (see Steps 123, 157, and 178).

This arrangement can omit the user's labor to perform the operation, which is frequently made after displaying the intersection enlarged view has been suppressed.

Modification of First Embodiment

Note that in the above-described embodiment, the display suppression history data has intersection-based entries each having approach/exit direction-based sub entries, and further, each sub entry has the value N. However, the present invention is not limited to this arrangement.

For example, it may be arranged such that the display suppression history data has multiple entries each having a set of time, intersection, and approach/exit direction, and every time the control circuit 19 receives the deletion operation or the enlarged view display operation, the control circuit 19 adds an entry to the display suppression history data. Here, the added entry includes an operation type (deletion operation or enlarged view display operation), a date and a time of the deletion operation or the enlarged view display operation, the guide intersection as the subject of the deletion operation or the enlarged view display operation, and the approach/exit direction of the intersection along the guide route. At Step 115, in place of the determination as to whether or not the value N exceeds the learning reference value, the control circuit 19 retrieves corresponding entries of the deletion operation or the enlarged view display operation. from the display suppression history data. Here, each of the corresponding entries has a set of a guide intersection where the vehicle is to enter next and the approach/exit direction of the guide intersection along the current guide route. Then the control circuit 19 determines whether or not a value, obtained by subtracting the number of the enlarged view display operation entries from the number of the retrieved deletion operation entries, exceeds the learning reference value.

Note that upon retrieval, entries having a date of a predetermined period (e.g., a year) before the current time may be excluded from the search range. That is, data past a predetermined-period in the display suppression history data may be excluded from the determination of displaying the intersection enlarged view and the determination of suppression of displaying the intersection enlarged view.

Further, the display suppression history data can have a single value N as a common value to all the intersections. That is, in the intersection enlarged view display control program, the control circuit 19 refers to and changes the same value N regardless of the intersection as the subject in the decision section.

Further, in the above embodiment, the determination of displaying an intersection enlarged view and the determination of suppression of displaying an intersection enlarged view regarding the guide intersection in a guide route (corresponding to Step 115 in the intersection enlarged view display control program 100) are performed when the vehicle has entered in the decision section before the guide intersection; however, the present invention is not limited to this arrangement. For example, it may be arranged such that, immediately after the determination of a guide route, regardless of the current position of the vehicle, the determination of displaying the intersection enlarged view and the determination of suppression are sequentially performed regarding guide intersections in the guide route, and the results of determinations are stored in the external storage medium 18 or the RAM 16. Then, when the vehicle has entered a decision section of each guide intersection in the guide route, the stored determination result for the corresponding guide intersection is read at Step 115, and displaying of the intersection enlarged view or suppressing of displaying the intersection enlarged view is actually performed.

Further, in the above-described embodiment, displaying of the intersection enlarged view is not performed at Step 120; however, it may be arranged such that at this time, the intersection enlarged view is displayed on the image display unit 13 for a period shorter than that at Steps 135 and 145 (e.g., only 2 seconds). Further, it may be arranged such that the intersection enlarged view is displayed on the image display unit 13 in an enlargement ratio lower than that at Steps 135 and 145. That is, the suppression is sufficient as long as displaying the intersection enlarged view is suppressed in comparison with other cases.

Further, in the above-described embodiment, the value N incremented upon deletion operation and the value N decremented upon enlarged view display operation have the same width or unit (i.e., 1.0); however, the present invention is not limited to this arrangement. For example, the above Step 140 may be changed such that when the user has depressed a button for the enlarged view display, the value N is decremented by a positive real number α (e.g., 0.5).

Further, in the above-described embodiment, the learning reference value used at the above Step 115 is a constant value; however, the learning reference value is not limited to the constant value. For example, it may be arranged such that when it is determined at Step 170 that the road is congested, the control circuit 19 reduces the learning reference value and proceeds to the determination processing at Step 115. That is, in the case of traffic congestion, the learning reference value may be reduced.

Further, in the above-described embodiment, the vehicle navigation apparatus is shown as an example of the navigation apparatus of the present invention; however, the navigation apparatus may be, e.g., a portable navigation apparatus.

Further, the present invention can be implemented as a program for execution of functions of the navigation apparatus by a computer.

Second Embodiment

Figure 6:
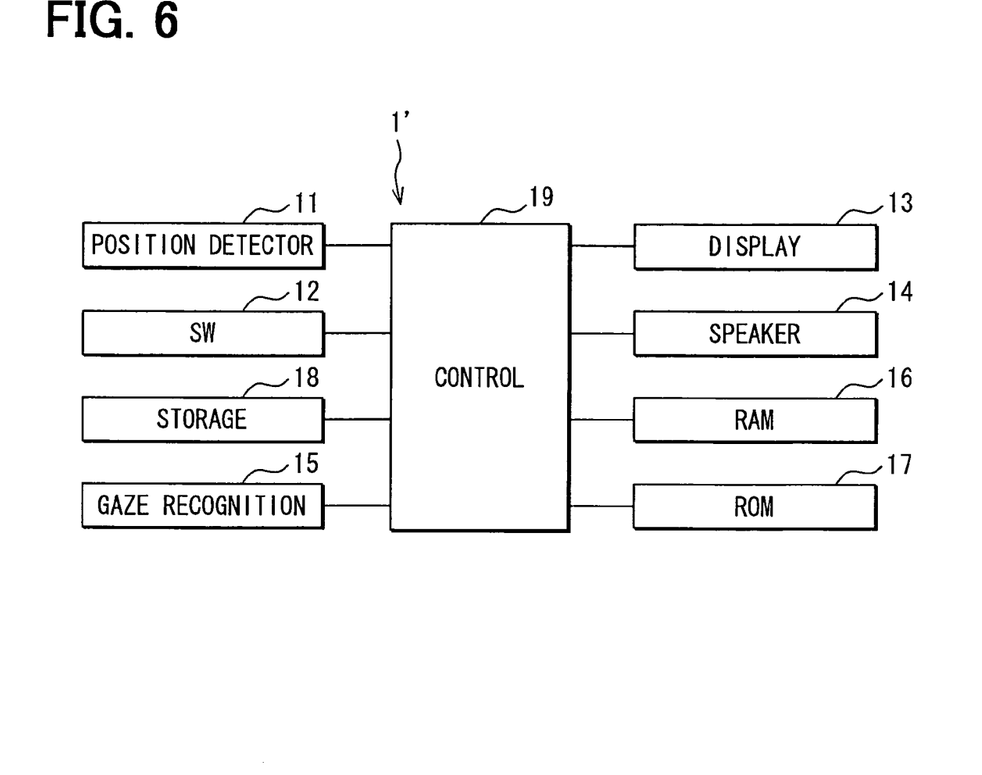
FIG. 6 is a block diagram showing a hardware construction of a vehicle navigation apparatus according to a second embodiment of the present invention.

Next, a second embodiment of the present invention will be described. FIG. 6 shows a hardware construction of a vehicle navigation apparatus 1' according to the present embodiment. Note that in FIG. 6, constituent elements having the same reference numerals as those in FIG. 1 have the same functions, therefore the details of these elements will be omitted. As shown in this figure, the vehicle navigation apparatus 1' has a gaze recognition unit 15 in addition to the constituent elements of the vehicle navigation apparatus 1 of the first embodiment.

Figure 7:
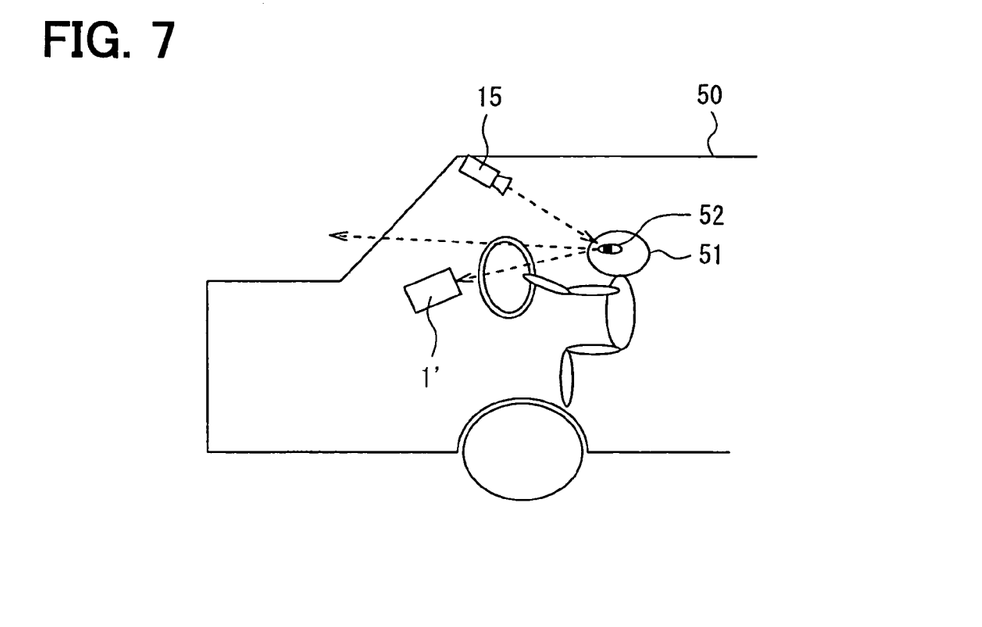
FIG. 7 is an explanatory view showing an arrangement of the vehicle navigation apparatus and a gaze recognition unit in a vehicle.

The gaze recognition unit 15 has a camera and an infrared light emitting device for gaze recognition. FIG. 7 shows the arrangement of the vehicle navigation apparatus 1' and the gaze recognition unit 15 in a vehicle 50. The other units of the vehicle navigation apparatus 1' than the gaze recognition unit 15 are provided at the center of an instrumental panel forward of a driver 51. The image display unit 13 of the vehicle navigation apparatus 1' is provided in a lower left direction viewed from the position of the face of the driver 51. Accordingly, to look at the image display unit 13 of the vehicle navigation apparatus 1', a gaze direction (or a line of sight) of the driver 51 is lower than that when the driver looks at a windshield. The gaze recognition unit 15 is installed around the boundary between the windshield and the vehicle ceiling. The camera of the gaze recognition unit 15 performs image sensing on eyes 52 of the driver 51 and a portion around the eyes 52, and outputs an obtained image to the control circuit 19.

The infrared light emitting device emits infrared light toward the face of the driver 51. The camera receives the infrared light reflected from the face of the driver 51, and outputs image data based on the received infrared light, i.e., image data of the user's face to the control circuit 19. Further, the camera and the infrared light emitting device may be arranged such that the image sensing direction and light emission direction follow the movement of the face of the driver 51.

Figure 8:
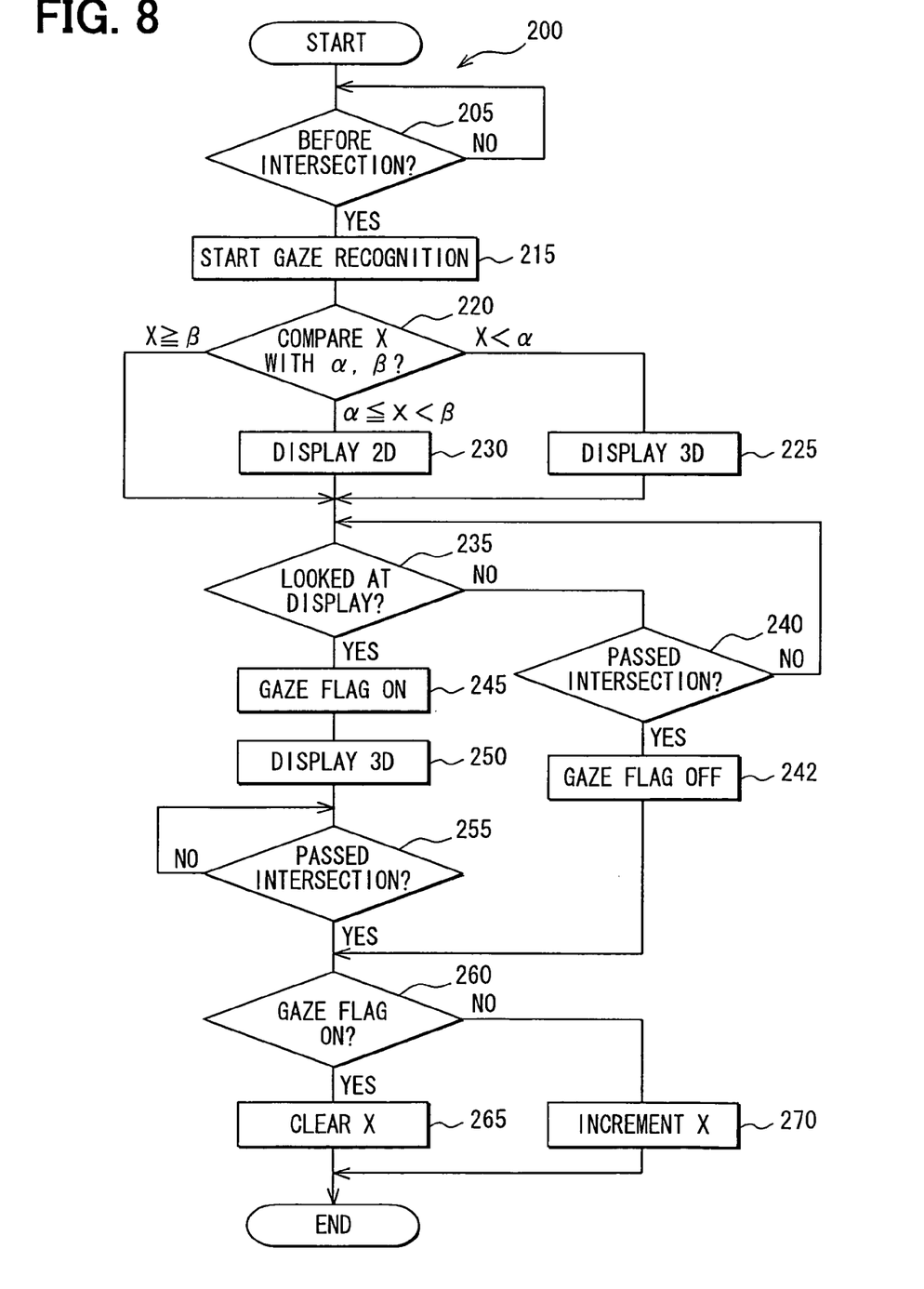
FIG. 8 is a flowchart showing an intersection enlarged view display control program.

The operation of the control circuit 19 of the present embodiment is the same as that of the control circuit 19 of the first embodiment except that the control circuit 19 of the present embodiment performs an intersection enlarged view display control program 200 shown in FIG. 8 in place of the intersection enlarged view display control program 100.

Hereinbelow, the operation of the control circuit 19 which performs the intersection enlarged view display control program 200 will be described. During the route guide processing, the control circuit 19 repeatedly executes the intersection enlarged view display control program 200. First, at Step 205, it is determined whether or not the vehicle is currently within a predetermined distance (e.g., several 100 meters) before a guide intersection. When the determination is affirmative, Step 215 is performed, while when the determination is negative, Step 205 is performed again.

At Step 215, gaze recognition processing is started. The control circuit 19 performs the gaze recognition processing in parallel with the execution of the intersection enlarged view display control program 200, and upon execution, always detects the line of sight from the driver 51 to the image display unit 13. More particularly, in the gaze recognition processing, the control circuit 19 specifies the range of the eyes 52 of the driver 51 and the ranges of pupils in the eyes 52 based on contrasting density of the image inputted from the gaze recognition unit 15, and specifies the positions of the pupils with respect to the contour of the eyes 52. When the pupils have moved to a lower right position, i.e., the driver 51 turns his/her gaze to the lower left direction, it is determined that the driver 51 turns his/her gaze on the image display unit 13. Note that in the gaze recognition processing, it may be arranged such that the direction of the face of the driver 51 as well as the position of the pupils to the eyes 52 is detected, and the direction of the gaze of the driver 51 is specified based on the pupil positions and the detected face direction.

Next, at Step 220, a counter value X is compared with a threshold value α and a threshold value β. The counter value X to be described later is a value indicating the number of times when the driver 51 has never turned his/her gaze on the image display unit 13 in a decision section before the guide intersection. The counter value X and the threshold values α and β are integers respectively stored in the external storage medium 18. Further, the threshold value α is less than the threshold value β. When it is determined as a result of comparison that the counter value X is less than the threshold value α, Step 225 is performed. When it is determined that the counter value X is equal to or greater than the threshold value α and less than the threshold value β, Step 230 is performed. When it is determined that the counter value X is equal to or greater than the threshold value β, Step 235 is performed.

Figure 9:
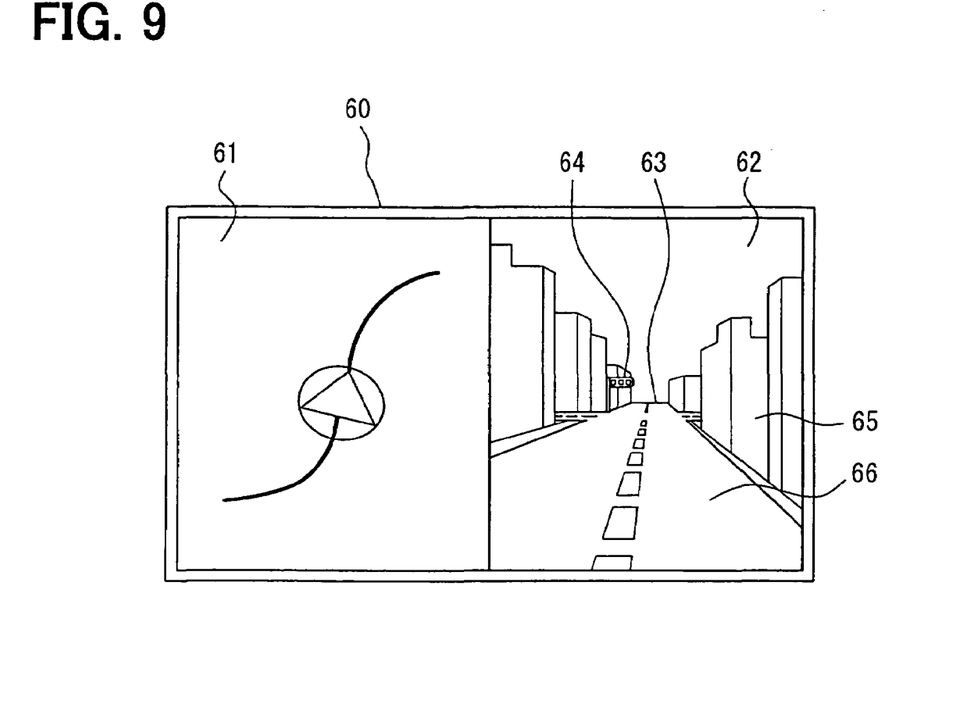
FIG. 9 is an example of a map display including an intersection 3D enlarged view.

At Step 225, the image display unit 13 displays a 3D enlarged view of the guide intersection. FIG. 9 shows an example 60 of the display image on the image display unit 13 at this time. In the display image 60, the left half part is a wide area route view 61 showing the current position and the guide route in a wide area, and the right half part is the intersection 3D enlarged view 62. The intersection 3D enlarged view 62 is an image representing the intersection stereoscopically. More particularly, the intersection 3D enlarged view 62 includes a forehand horizon 63, a stereoscopically-drawn traffic light 64, a stereoscopically-drawn roadside building 65, and a road 66 drawn in perspective such that a near part is wide and a far part is narrow. Note that the display of the intersection 3D enlarged view by the image display unit 13 is continued until the vehicle has moved out of the intersection.

Figure 10:
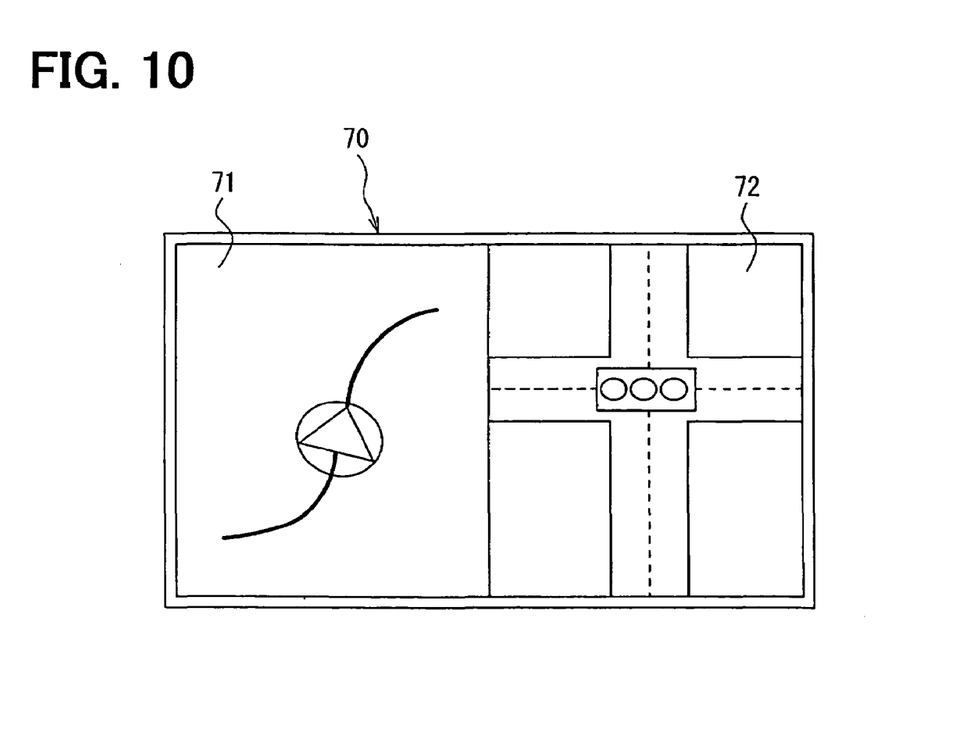
FIG. 10 is an example of a map display including an intersection 2D enlarged view.

At Step 230, the image display unit 13 displays a 2D intersection enlarged view of the guide intersection. FIG. 10 shows an example 70 of the display image on the image display unit 13 at this time. In the display image 70, the left half part is a wide area route view 71 showing the current position and the guide route in a wide area, and the right half part is the intersection 2D enlarged view 72. The intersection 2D enlarged view 72 is an image showing the road as a top plan view from a position above the intersection and showing the building, the traffic light and the like around the road as icons.

Figure 11:
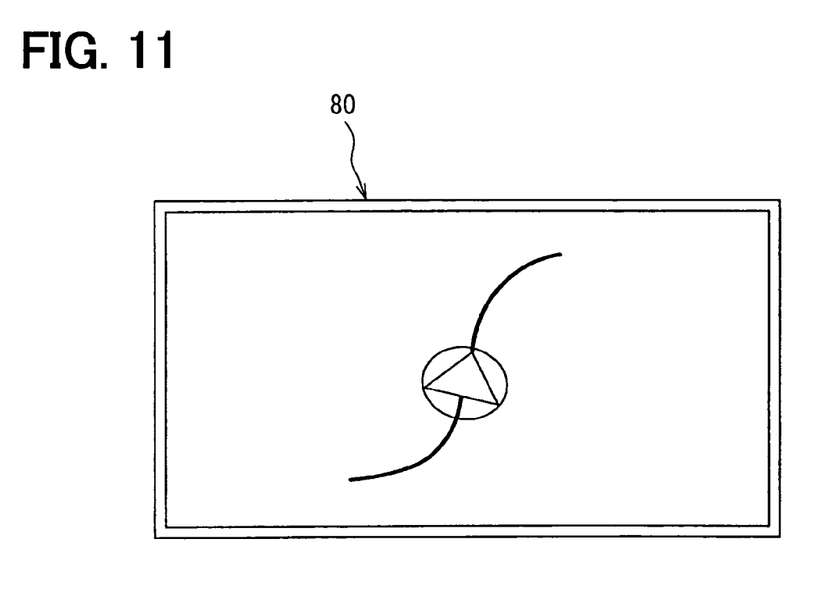
FIG. 11 is an example of a map display without an intersection enlarged view.

Note that it may be arranged such that when the counter value X is equal to or greater than the threshold value β at Step 220, the image display unit 13 produces the same display as that without the decision section before the guide intersection, e.g., the display of only a wide area route view 80 as shown in FIG. 11, otherwise, displays nothing.

At Step 235, it is determined whether or not the driver has looked at the image display unit 13. In other words, it is determined whether the driver's gaze has been turned on the image display unit 13 since the gaze recognition processing was started at the immediately previous Step 215, based on the result of gaze recognition processing. When the driver has not looked at the image display unit 13, Step 240 is performed. In contrast, when the driver has looked at the image display unit 13, Step 245 is performed.

At Step 240, it is determined whether or not the vehicle has passed the guide intersection. When it is determined that the vehicle has passed the intersection, Step 242 is performed. When it is determined that the vehicle has not passed the intersection, Step 235 is performed. In this manner, until the vehicle has passed the guide intersection or the driver turns his/her gaze on the image display unit 13, executions of Step 235 and Step 240 is alternately repeated.

At Step 242, a gaze flag value as a variable held in the RAM 16 is turned OFF. The gaze flag is employed to record information indicating that the driver has looked at the image display unit 13 even once or the driver has never looked at the image display unit 13 in a predetermined section before a guide intersection. Following Step 242, Step 260 is performed.

When the driver has looked at the image display unit 13, then at Step 245, the gaze flag value is turned ON. Next, at Step 250, when an intersection 3D enlarged view is not currently displayed on the image display unit 13, the intersection 3D enlarged view is displayed on the image display unit 13.

Next, at Step 255, it is determined whether or not the vehicle has passed the guide intersection. When it is determined that the vehicle has passed the guide intersection, Step 260 is performed. When it is determined that the vehicle has not passed the guide intersection, the determination is repeated.

At Step 260, it is determined whether or not the gaze flag is ON. When it is determined that the gaze flag is ON, the counter value X is cleared to zero at Step 265. When it is determined that the gaze flag is OFF, the counter value X is incremented by "1" at Step 270. After Step 265 or Step 270, the execution of the intersection enlarged view display control program 200 is completed.

As the control circuit 19 executes the above-described intersection enlarged view display control program 200, in a decision section before a guide intersection in a guide route (see Step 205), the vehicle navigation apparatus 1' starts the gaze recognition processing using the gaze recognition unit 15 (see Step 215). Further, the vehicle navigation apparatus 1' compares the counter value X (corresponding to count data and suppression history data) with the threshold values α and β (see Step 220). When the counter value X is equal to or greater than the threshold value β, the apparatus displays a route map without displaying the intersection enlarged view. When the counter value X is equal to or greater than the threshold value α and less than the threshold value β, the apparatus displays an intersection 2D enlarged view (see Step 230). When the counter value X is less than the threshold value α, the apparatus displays an intersection 3D enlarged view (see Step 225).

Further, in a case where the driver has never looked at the image display unit 13 (see Step 235) while the vehicle has passed the guide intersection (see Step 240), the vehicle navigation apparatus 1' turns the gaze flag OFF. Further, in a case where the driver has looked at the image display unit 13 even once (see Step 235) before the vehicle has passed the guide intersection (see Step 240), the vehicle navigation apparatus 1' turns the gaze flag ON, then displays an intersection 3D enlarged view when it is not displayed (see Step 250), and waits for the vehicle's passing through the intersection (see Step 255).

Further, when the vehicle has passed the intersection, the vehicle navigation apparatus 1' clears the counter value X to zero (see Step 265) based on the gaze flag being ON (see Step 260). When the vehicle has passed the intersection, increments the counter value X by "1" (see Step 270) based on the gaze flag being OFF (see Step 260). That is, in a case where the driver has never looked at the image display unit 13 while the vehicle has passed the guide intersection, the counter value X is incremented by "1", on the other hand, in a case where the driver has looked at the image display unit 13 even once before the vehicle has passed the intersection, the counter value X is cleared to zero.

In the vehicle navigation apparatus 1', in a decision section before an intersection, the counter value X as display suppression history data is changed to more advantageous value so as to meet the above-described suppression criterion, i.e., the counter X is equal to or greater than the threshold value β, based on the behavior of the driver (or user). This behavior of the driver indicates that the driver does not need the display of an intersection enlarged view, i.e., the fact that the driver has never turned his/her gaze on the image display unit 13 in the decision section. Then, such change that the display suppression history data becomes more advantageous to meet the suppression criterion is repeated. When the data thereby meets the suppression criterion, the vehicle navigation apparatus 1' suppresses displaying an intersection 3D enlarged view on the display unit in the decision section before the intersection along the guide route. The vehicle navigation apparatus 1' displays an intersection 2D enlarged view instead of an intersection 3D enlarged view, or does not display any intersection enlarged view. Accordingly, the vehicle navigation apparatus 1' can perform displaying an intersection enlarged view in accordance with the driver's requirement based on the history of the driver's behavior, i.e., the driver has never turned his/her gaze on the display unit.

Further, in the vehicle navigation apparatus 1', in a decision section before an intersection, the counter value X is cleared to zero not to meet the suppression criterion based on the recognition of the driver's gaze on the display unit by the gaze recognition function. Accordingly, the driver's gaze on the display unit is reflected in displaying of the intersection enlarged view and the determination of suppression of displaying the intersection enlarged view. Further, even when the case where the driver never looked at the display apparatus in a decision section before a guide intersection is repeated, once the driver turns his/her gaze on the display unit, the suppression criterion is not satisfied. Accordingly, the vehicle navigation apparatus 1' can quickly respond to the driver's request for displaying of the intersection enlarged view.

Further, in the vehicle navigation apparatus 1', in a decision section before an intersection, even when an intersection 3D enlarged view is not displayed, the intersection 3D enlarged view can be displayed within the decision section based on the driver's gaze on the display unit (see Step 250). Accordingly, the vehicle navigation apparatus 1' can quickly respond to the driver's request for displaying of the intersection enlarged view.

Figure 12:
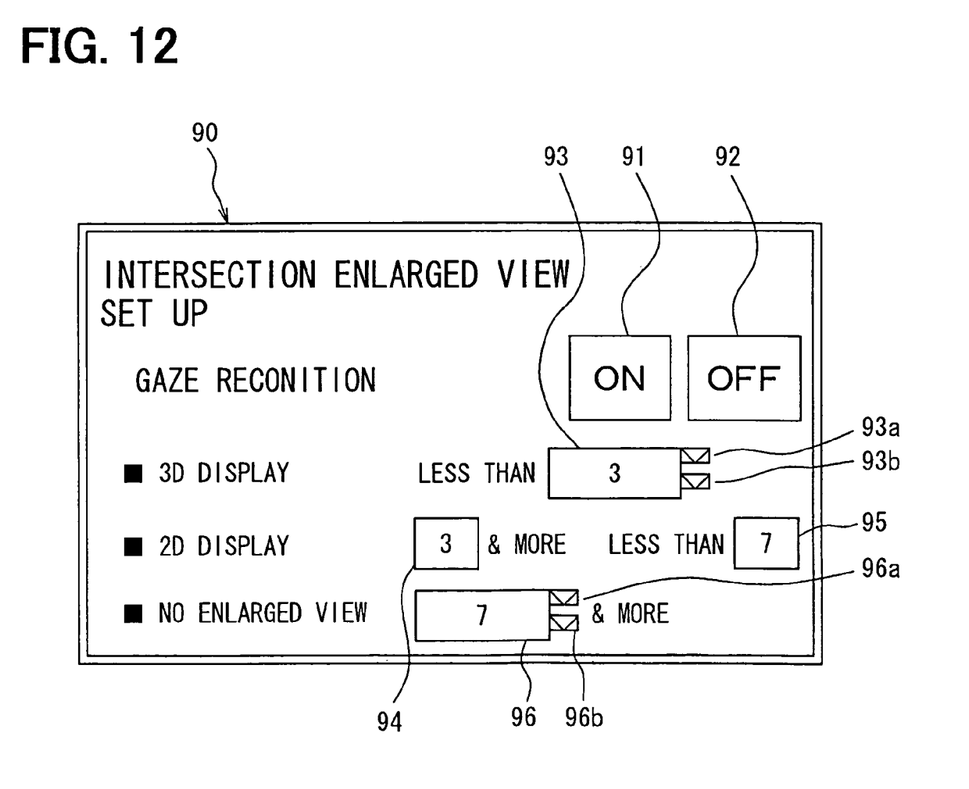
FIG. 12 is an example of a screen image of an intersection enlarged view display setup.

Further, the above-described threshold values α and β can be freely set by the user by operating the operation switch group 12. More particularly, when the control circuit 19 detects the operation at the operation switch group 12 to change the threshold values α and β, a threshold value setting screen image 90 as shown in FIG. 12 is displayed on the image display unit 13. Further, when the control circuit 19 detects a predetermined operation at the operation switch group 12, the display of the threshold value setting screen image 90 is terminated on the image display unit 13. The threshold value setting screen image 90 shows an ON button 91, an OFF button 92, threshold value α display portions 93 and 94, a threshold value α up button 93a, a threshold value α down button 93b, threshold value β display portions 95 and 96, a threshold value β up button 96a, and a threshold value β down button 96b. The threshold value α display portions 93 and 94 indicate the value of the threshold value α at the time of display; the threshold value β display portions 95 and 96 indicate the value of the threshold value β at the time of display. Note that the user can select the above-described respective buttons 91, 92, 93a, 93b, 96a, and 96b using the operation switch group 12. The selection using the operation switch group 12 includes moving a cursor on the threshold value setting screen image 90 to a desired button and thereby selecting the button by operating the mechanical switches of the operation switch group 12, and depressing a portion of the touch panel of the operation switch group 12 corresponding to a desired button.

When selection of the ON button 91 by the user is detected while the threshold value setting screen image 90 is displayed, the control circuit 19 becomes able to execute the intersection enlarged view display control program 200. When selection of the OFF button 92 is detected, the control circuit 19 does not execute the intersection enlarged view display control program 200. Further, when selection of the up button 93a is detected, the control circuit 19 increments the threshold value α by the number of selections, and the value as a result of increment is reflected in the threshold value α display portions 93 and 94. Further, when selection of the down button 93b is detected, the control circuit 19 decrements the threshold value α by the number of selections, and the value as a result of decrement is reflected in the threshold value α display portions 93 and 94. Further, when selection of the up button 96a is detected, the control circuit 19 increments the threshold value β by the number of selections, and the value as a result of increment is reflected in the threshold value β display portions 95 and 96. Further, when selection of the down button 96b is detected, the control circuit 19 decrements the threshold value β by the number of selections, and the value as a result of decrement is reflected in the threshold value β display portions 95 and 96.

Modification of Second Embodiment

Note that in the above-described second embodiment, the display suppression history data is the single counter value X; however, the display suppression history data is not limited to a single data. For example, as in the case of the value N of the first embodiment, the counter value X may be provided for each pair of the intersection and its approach/exit direction.

More particularly, the display suppression history data may have a structure where each entry of the intersection has sub entries of approach/exit directions, and each sub entry has the counter value X. Upon execution of the intersection enlarged view display control program 200, the control circuit 19 may use the counter value X of entry corresponding to the approach/exit direction along the current guide route in the decision section before the guide intersection, at Steps 220, 265 and 270. In this case, the vehicle navigation apparatus 1' performs or suppresses displaying the intersection enlarged view in accordance with a driver's requirement for each pair of the intersection and its approach/exit direction.

Further, for example, the display suppression history data may have multiple entries each has a set of a time, an intersection, and its approach/exit direction. In this arrangement, upon each execution of the intersection enlarged view display control program 200, the control circuit 19 adds an entry having a gaze flag value set at that time, a date and a time of the execution, a guide intersection as the subject of the control, and an approach/exit direction of the guide intersection along the guide route, to the display suppression history data. Then, in place of the comparison between the counter value X and the threshold values $\alpha$ and $\beta$ at Step 220, the control circuit 19 may retrieve entries of the gaze flag ON and the gaze flag OFF having a pair of a guide intersection and an approach/exit direction along the current guide route from the display suppression history data and compare the threshold values $\alpha$ and $\beta$ with a value obtained by subtracting the number of gaze flag ON entries from the number of gaze flag OFF entries.

Note that upon the above retrieval, entries having dates before the current date by a predetermined period (e.g., a year) may be excluded from the retrieval subjects. That is, predetermined-period past data in the display suppression history data may be excluded from subjects of displaying of the intersection enlarged view and determination of suppression of displaying.

Further, in the second embodiment, displaying of the intersection enlarged view and determination of suppression of displaying the intersection enlarged view regarding a guide intersection in a guide route (corresponding to Step 220 of the intersection enlarged view display control program 200) is performed when the vehicle has entered a decision section before the guide intersection; however, these operations are not necessarily performed at this timing. For example, it may be arranged such that immediately after a guide route has been determined, regardless of the current vehicle position, determination of displaying the intersection enlarged view and determination of suppression of displaying are sequentially performed in the guide route, and the results of determinations are stored in the external storage medium 18 or the RAM 16. Then, when the vehicle has entered a decision section of a guide intersection in the guide route, in place of Steps 220, 225, and 230, the result of determination about the guide intersection is read, and displaying of the intersection enlarged view or suppressing of displaying is actually performed.

Further, in the above-described second embodiment, it may be arranged such that immediately after the control circuit 19 determines at Step 220 that the counter value X is equal to or greater than the threshold value $\beta$, it displays an intersection 3D enlarged view on the image display unit 13 for a period shorter than that of displaying of the intersection 3D enlarged view at Step 225 (e.g. only 2 seconds). Otherwise, the intersection 3D enlarged view may be displayed on the image display unit 13 at a suppressed enlargement ratio in comparison with that at Step 225. That is, the suppression is sufficient as long as displaying of the intersection enlarged view is suppressed in comparison with that at Step 225.

Further, it may be arranged such that in a case where an approach road along a guide route before a guide intersection is congested by traffic, the control circuit 19 uses two values respectively less than the stored threshold values $\alpha$ and $\beta$ in the above-described determination at Step 220. Note that it may be determined whether or not the approach road is congested based on, e.g., VICS information received from an FM station.

Further, in the above-described second embodiment, the vehicle navigation apparatus is described as an example of the navigation apparatus of the present invention; however, a portable navigation apparatus may be used as the navigation apparatus.

Further, in the above-described second embodiment, the gaze recognition processing performed by the control circuit 19 may be realized with hardware specialized for the gaze recognition processing.

Further, in the above-described second embodiment, it may be arranged such that the gaze recognition unit 15 also obtains image(s) of face(s) of passenger(s) in a front seat or a rear seat, and in the gaze recognition processing, gazes of such passenger(s) other than the driver on the image display unit 13 are detected. In this case, at Step 235, it may be determined whether or not any one of passengers has looked at the image display unit 13.

Further, the counter value X and the threshold values $\alpha$ and $\beta$ may be stored, not in the external storage medium 19 but in a rewritable nonvolatile storage medium (e.g., EEPROM).

It will be obvious to those skilled in the art that various changes may be made in the above-described embodiments of the present invention. However, the scope of the present invention should be determined by the following claims.

What is claimed is:

1. A navigation apparatus comprising:
   a display control unit that displays an enlarged view of an intersection on a display unit in a section before the intersection;
   a suppression instruction detection unit that detects a suppression instruction of displaying the enlarged view of the intersection;
   a storage unit that stores display suppression history data by associating a detection of the suppression instruction with a position of the intersection;
   a suppression history determination unit that determines whether the display suppression history data satisfies a predetermined display suppression criterion; and
   a suppression unit that suppresses displaying the enlarged view of the intersection when the display suppression history data is determined to satisfy the predetermined display suppression criterion.

2. The navigation apparatus of claim 1,
   wherein the storage unit also stores a number of detections of the suppression instruction, and
   wherein, when the number of detections of the suppression instruction is equal to or greater than a predetermined number, the suppression history determination unit determines that the predetermined display suppression criterion is satisfied.

3. The navigation apparatus of claim 1, further comprising:
   a passing direction detection unit that detects, with respect to an intersection, a passing direction in which a vehicle, in which the navigation apparatus is provided, approaches the intersection and exits from the intersection,
   wherein the storage unit stores the display suppression history data by associating the detection of the suppression instruction with (i) the position of the intersection and (ii) a passing direction that is detected by the passing direction detection unit with respect to the intersection, and wherein the suppression history determination unit determines whether the predetermined display suppression criterion is satisfied, further based on the detected passing direction.

4. The navigation apparatus of claim 1, further comprising:
a reception unit that receives an operation by a user;
wherein the suppression instruction detection unit detects the suppression instruction based on an operation that is received by the reception unit for deleting a display of the enlarged view of the intersection.

5. The navigation apparatus of claim 1, further comprising:
an action detection unit that detects an action by a user,
wherein the suppression instruction detection unit detects the suppression instruction based on an action that is detected by the action detection unit for indicating that displaying the enlarged view of the intersection is not needed.

6. The navigation apparatus of claim 5,
wherein the action detection unit includes a gaze recognition unit to recognize a user's gaze direction, and
wherein the suppression instruction detection unit detects the suppression instruction when the gaze recognition unit does not recognize the user's gaze direction to the display unit in the section before the intersection.

7. The navigation apparatus of claim 1, further comprising:
a traffic congestion determination unit that determines whether the intersection is congested by traffic,
wherein, when the traffic congestion determination unit determines that the intersection is congested, the suppression unit suppresses displaying the enlarged view of the intersection in the section before the intersection.

8. The navigation apparatus of claim 1, further comprising:
a suspension instruction detection unit that detects a suspension instruction to suspend the suppression of displaying the enlarged view of the intersection in the section before the intersection,
wherein when the suspension instruction detection unit detects the suspension instruction, the suppression of displaying the enlarged view of the intersection by the suppression unit is suspended, and displaying the enlarged view of the intersection is performed by the display control unit.

9. The navigation apparatus of claim 8,
wherein the storage unit also stores a number of detections of the suppression instruction,
wherein, when the number of detections of the suppression instruction is equal to or greater than a predetermined number, the suppression history determination unit determines that the predetermined display suppression criterion is satisfied, and wherein, when the suspension instruction detection unit detects the suspension instruction, the number of detections of the suppression instruction is decremented by a predetermined unit.

10. The navigation apparatus of claim 8, further comprising:
a reception unit that receives an operation by a user,
wherein upon suppression of displaying the enlarged view of the intersection by the suppression unit, the suspension instruction detection unit detects the suspension instruction based on an operation that is received by the reception unit for performing displaying the enlarged view of the intersection.

11. The navigation apparatus of claim 8, further comprising:
a gaze recognition unit that recognizes a user's gaze direction,
wherein upon suppression of displaying the enlarged view of the intersection by the suppression unit, the suspension instruction detection unit detects the suspension instruction based on a user's gaze direction to the display unit that is recognized by the gaze recognition unit.

12. The navigation apparatus of claim 1, further comprising:
a reception unit that receives at least one of (i) a deletion operation by a user to delete a display of the enlarged view of the intersection and (ii) a screen display change operation by the user to change screen display on the display unit;
a deletion control unit that deletes a display of the enlarged view of the intersection on the display unit based on the deletion operation received by the reception unit;
a learning unit that stores, into a storage medium, history data of the screen display change operation received by the reception unit over a period after displaying the enlarged view is suppressed by the suppression unit or over a period after the display of the enlarged view is deleted by the deletion control unit; and
a learning reproduction unit that changes the screen display on the display unit based on the history data stored in the storage medium when displaying the enlarged view is suppressed when the display of the enlarged view is deleted.

13. The navigation apparatus of claim 1,
wherein the display control unit displays a 3D enlarged view of the intersection on the display unit as the enlarged view of the intersection, and
wherein the suppression unit displays a 2D enlarged view of the intersection on the display unit by suppressing displaying the 3D enlarged view of the intersection.

* * * * *